(12) United States Patent
Kojima

(10) Patent No.: US 7,733,415 B2
(45) Date of Patent: Jun. 8, 2010

(54) ILLUMINATION APPARATUS FOR IMAGE-TAKING

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 11/343,605

(22) Filed: Jan. 31, 2006

(65) Prior Publication Data

US 2006/0203121 A1    Sep. 14, 2006

(30) Foreign Application Priority Data

Mar. 10, 2005    (JP) .............................. 2005-068190

(51) Int. Cl.
*H04N 5/222* (2006.01)
(52) U.S. Cl. ..................... 348/371; 362/16; 362/17; 396/155; 348/370
(58) Field of Classification Search ................ 348/370, 348/371; 362/268, 626, 16, 326, 3, 17; 396/155
See application file for complete search history.

(56) References Cited

U.S. PATENT DOCUMENTS 6,050,705 A    4/2000    Kusserow et al.

FOREIGN PATENT DOCUMENTS

JP    2000-250102    9/2000
JP    2003-287792 A    10/2003

OTHER PUBLICATIONS

The above references were cited in a May 23, 2008 Chinese Office Action issued in the counterpart Chinese Patent Application 200610054763.X, which is enclosed with an English translation.

*Primary Examiner*—David L Ometz
*Assistant Examiner*—Antoinette T Spinks
(74) *Attorney, Agent, or Firm*—Cowan, Liebowitz & Latman, P.C.

(57) ABSTRACT

A small illumination apparatus including an optical member less affected by heat from a light source is disclosed. The illumination apparatus has a light source and an optical member closer to a light irradiation side than the light source and having an entrance surface formed as a refractive surface. The entrance surface has a first area receiving a first light component emitting from the light source at an angle smaller than a first angle with respect to an irradiation optical axis and a second area receiving a second light component emitting at an angle larger than the first angle with respect to the irradiation optical axis. The second area is positioned closer to the light source than the first area in the irradiation optical axis direction. Each of the first and second areas is formed a flat surface or a curved surface having a concave shape facing the light source.

4 Claims, 11 Drawing Sheets

ILLUMINATION APPARATUS FOR IMAGE-TAKING

BACKGROUND OF THE INVENTION

The present invention relates to an illumination apparatus for use in an image-taking apparatus or the like.

An illumination apparatus for use in an image-taking apparatus such as a camera is formed of a light source and optical members such as a reflective mirror and a Fresnel lens for directing luminous flux emitting from the light source toward a light irradiation side (toward a subject). A variety of small illumination apparatuses have been proposed for efficiently gathering luminous flux emitting from the light source in various directions to a necessary irradiation area.

Particularly, some of recently proposed apparatuses employ an optical member which achieves total reflection such as a prism and a light guide provided to realize uniform light distribution, improved light-gathering efficiency, and a reduced size, instead of a Fresnel lens disposed closer to a subject than a light source.

For example, Japanese Patent Laid-Open No. 2000-250102 has proposed an illumination apparatus having an optical prism for applying luminous flux from a light source in a light irradiation direction, in which the optical prism has a first entrance surface which receives part of the luminous flux from the light source that emits close to an irradiation optical axis, an emergence surface from which the luminous flux from the first entrance surface directly emerges, a second entrance surface which receives part of the luminous flux from the light source that emits at a larger angle than that close to the irradiation optical axis, and a total reflection surface which totally reflects the luminous flux from the second entrance surface and causes the reflected luminous flux to emerge from the emergence surface. In the illumination apparatus, the abovementioned respective surfaces are formed to have shapes in which a certain correlation is established between the angle of luminous flux emitting from the center of the light source with respect to the irradiation optical axis and the angle of luminous flux emerging from the emergence surface with respect to the irradiation optical axis.

As the material of the optical prism, an optical resin material such as acrylic resin is often used in view of the moldability and cost.

In the illumination apparatus of this type, the light source produces a large amount of heat together with light. To prevent deformation of the optical material due to the heat, it is necessary to select the optical material and define the heat radiation space in consideration of thermal energy produced in one light emission and the shortest light-emission cycle. As a result, in the illumination apparatus proposed in Japanese Patent Laid-Open No. 2000-250102 described above, a somewhat large distance needs to be ensured between the second entrance surface which receives the luminous flux emitting from the light source at a relatively large angle and the light source.

With the position of the second entrance surface set in this manner, however, the height of the optical prism is easily increased, which makes it difficult to reduce the size of the illumination apparatus.

BRIEF SUMMARY OF THE INVENTION

It is an object of the present invention to provide a small illumination apparatus in which an optical member is less affected by heat from a light source.

According to an aspect, the present invention provides an illumination apparatus having a light source and an optical member disposed closer to a light irradiation side than the light source and having an entrance surface formed as a refractive surface. The entrance surface has a first area which receives a first light component emitting from the light source at an angle smaller than a first angle with respect to an irradiation optical axis and a second area which receives a second light component emitting at an angle larger than the first angle with respect to the irradiation optical axis. The second area is positioned closer to the light source than the first area in the direction of the irradiation optical axis. Each of the first and second areas is formed as one of a flat surface and a curved surface having a concave shape facing the light source.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
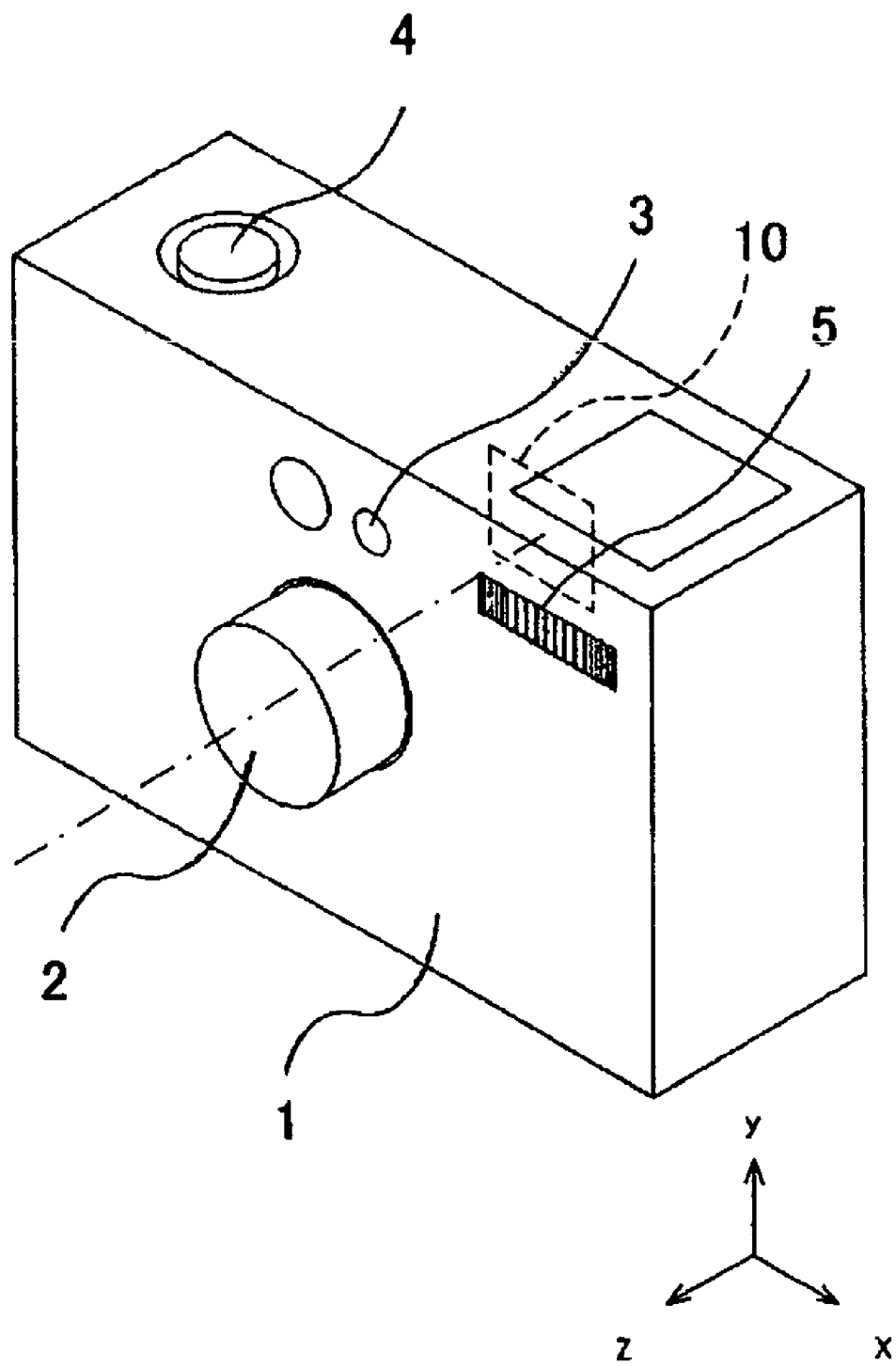
FIG. 1 schematically shows a camera including an illumination apparatus which is Embodiment 1 of the present invention.

FIG. 1 schematically shows the structure of a camera (an image-taking apparatus) including an illumination apparatus which is Embodiment 1 of the present invention.

In FIG. 1, reference numeral 1 shows a camera body. Reference numeral 2 shows a lens barrel which holds an image-taking lens, not shown. Reference numeral 10 shows an image-pickup device such as a CCD sensor and a CMOS sensor for photoelectrically converting a subject image formed by an image-taking optical system in the lens barrel. Reference numerals 3 and 4 show a viewfinder and a release button, respectively. Reference numeral 5 shows the above-mentioned illumination apparatus which is disposed in an upper right portion of the camera body 1 when viewed from the front.

While Embodiment 1 is described in conjunction with a compact camera integral with a lens, the present invention is applicable to an illumination apparatus which is internally or externally provided for a single-lens reflex camera with interchangeable lenses. In addition, while Embodiment 1 is described in connection with a digital camera, the present invention is applicable to an illumination apparatus mounted on a film camera.

Figure 2:
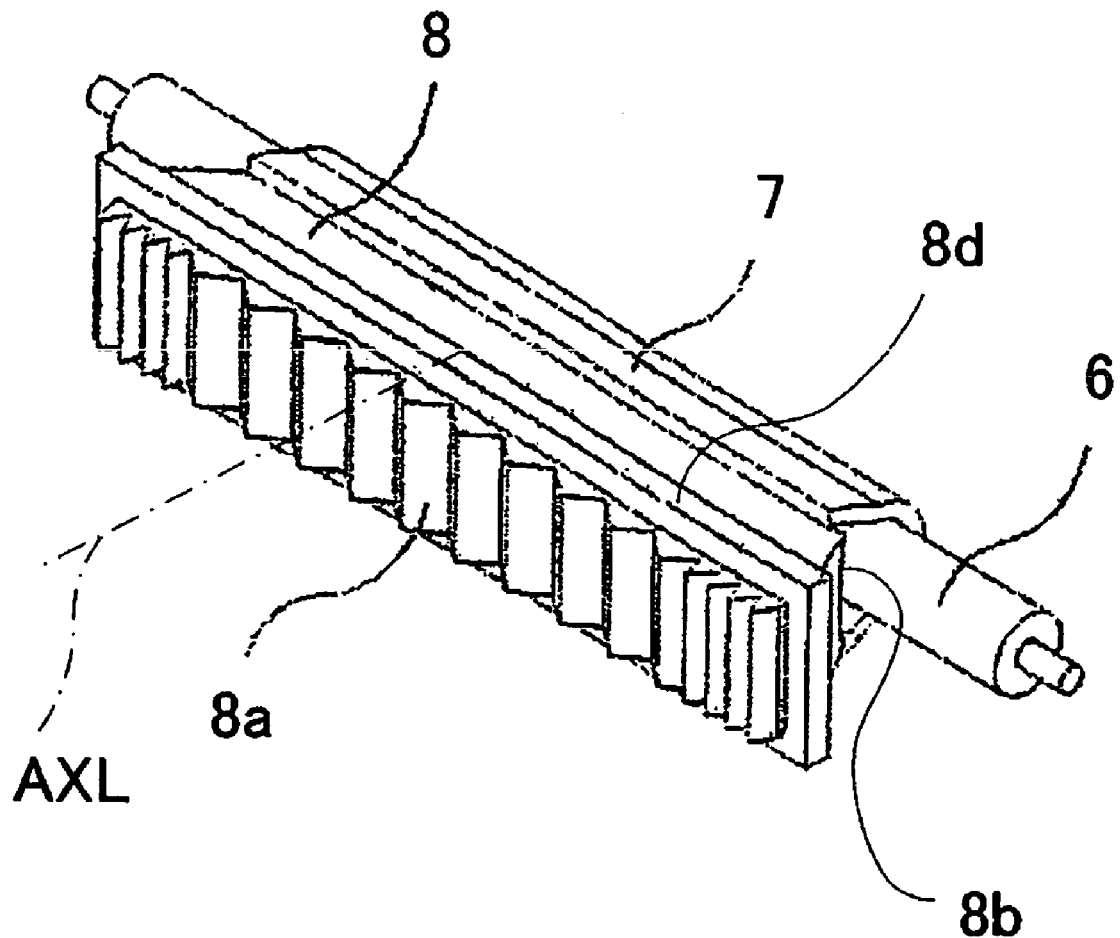
FIG. 2 is a perspective view showing the illumination apparatus of Embodiment 1.
Figure 3:
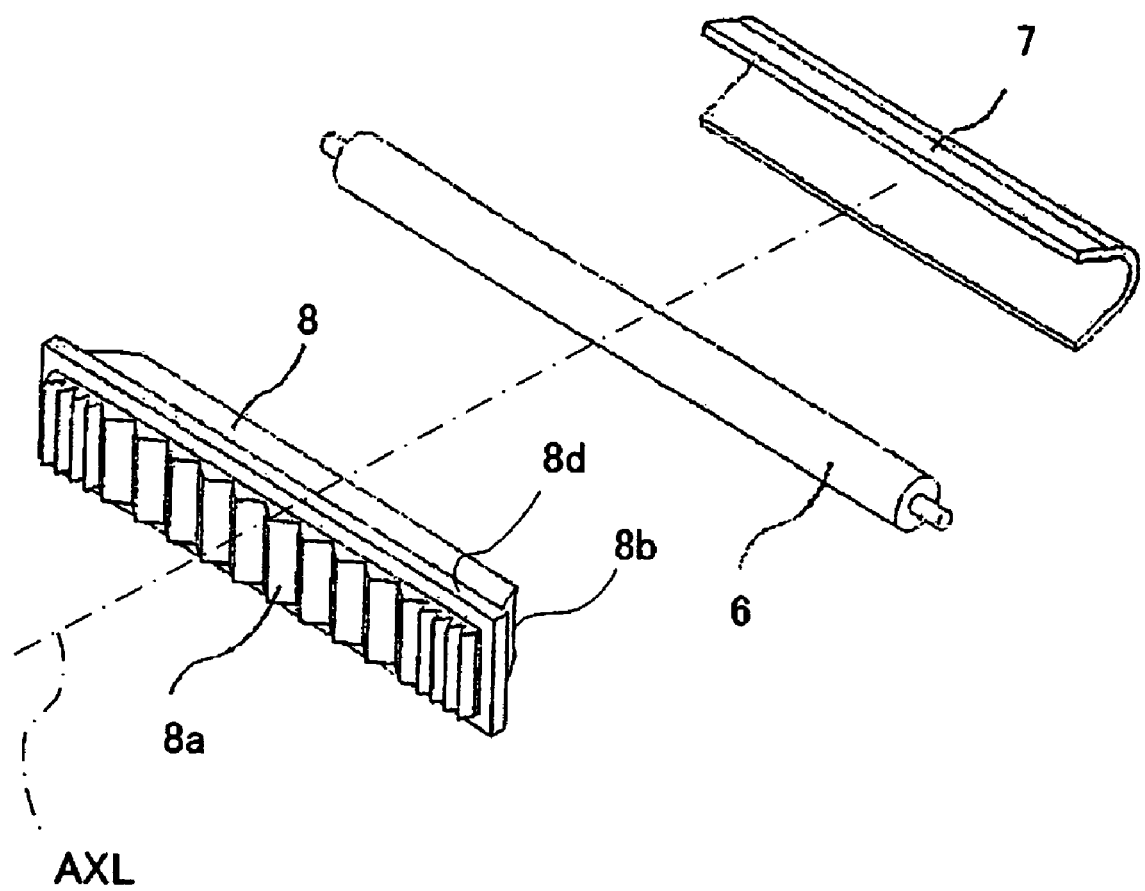
FIG. 3 is an exploded perspective view showing the illumination apparatus of Embodiment 1.

FIG. 2 is a perspective view showing the assembled illumination apparatus of Embodiment 1. FIG. 3 shows an exploded perspective view of the illumination apparatus. As shown in FIGS. 2 and 3, the illumination apparatus 5 has a cylindrical discharge arc tube (hereinafter referred to simply as an arc tube) 6 which serves as a light source and emits illumination light such as flash light, a reflective member 7 which reflects part of luminous flux radiated from the arc tube 6 that travels at a large angle with respect to an illumination optical axis AXL of the illumination apparatus in a plane (a YZ plane) orthogonal to the longitudinal direction (an X direction) of the arc tube 6 and part of the luminous flux that travels backward opposite to a subject and redirects those luminous flux components to the front toward the subject, and an optical prism (an optical member) 8 which efficiently applies luminous flux entering directly from the arc tube 6 and the luminous flux entering after the reflection by the reflective member 7 to a necessary irradiation range.

The reflective member 7 has a curvature in the plane orthogonal to the longitudinal direction of the arc tube 6, and its inner surface is made of a metal material such as bright aluminum having a high reflectivity. The optical member 8 is made of an optical material having a high transmittance such as optical glass and acrylic resin.

In the camera shown in FIG. 1 including the illumination apparatus described above, for example when an "auto-flash mode" is set and a user presses the release button 4, a central processing unit, not shown, determines whether or not it should cause the illumination apparatus to emit light based on the brightness of a subject measured by a photometric apparatus, not shown, and the sensitivity of the image-pickup device 10. If the central processing unit determines that it should cause the illumination apparatus to emit light, it outputs a light-emission signal to cause the arc tube 6 to emit light through a trigger lead, not shown, attached to the reflective member 7. Part of the emitted luminous flux at a large angle with respect to the irradiation optical axis AXL and part of the emitted luminous flux that travels backward enter the optical member 8 that is disposed in front of the arc tube 6 through the reflective member 7, while part of the emitted luminous flux at a relatively small angle with respect to the irradiation optical axis AXL directly enters the optical member 8. The light that entered the optical member 8 is changed to have a predetermined light distribution characteristic and then applied to a necessary irradiation area on the subject side.

In FIGS. 2 and 3, a prism surface 8*a* is formed on an emergence surface of the optical member 8 on the subject side for controlling the light distribution characteristic in the horizontal direction (the X direction). The light distribution characteristic in the vertical direction (the Y direction) is controlled by the optical member 8 and the reflective member 7.

In Embodiment 1, the shapes of the optical member 8 and the reflective member 7 are most appropriately specified in order to optimize the light distribution characteristic in the vertical direction (the Y direction). The setting of the optimal shapes of the optical member 8 and the reflective member 7 will hereinafter be described in detail with reference to FIGS. 4A to 4C.

Figure 4A:
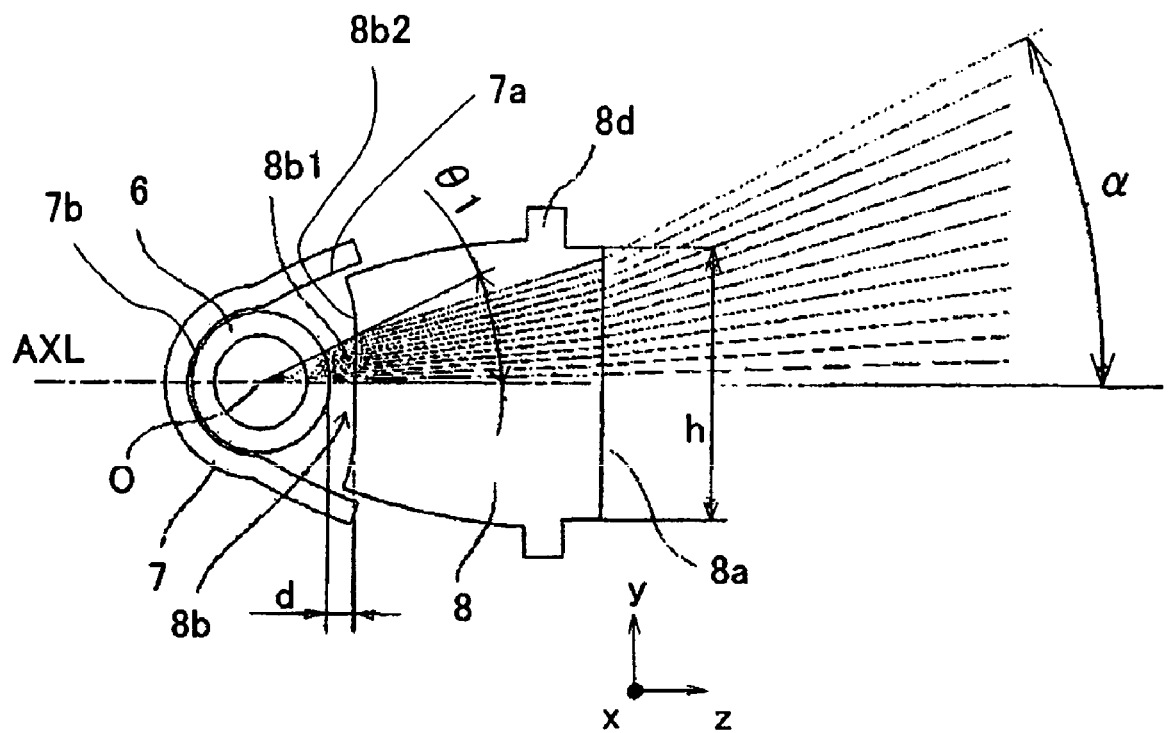
FIG. 4A is a section view of the illumination apparatus of Embodiment 1 in a YZ plane.
Figure 4B:
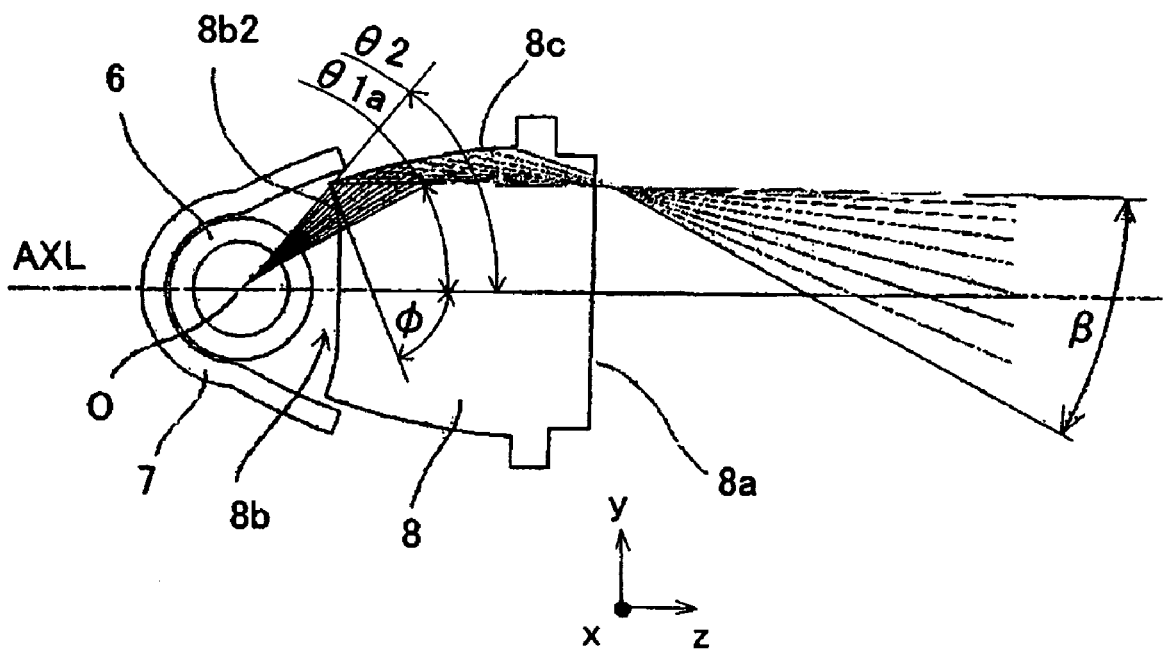
FIG. 4B is a section view of the illumination apparatus of Embodiment 1 in the YZ plane.
Figure 4C:
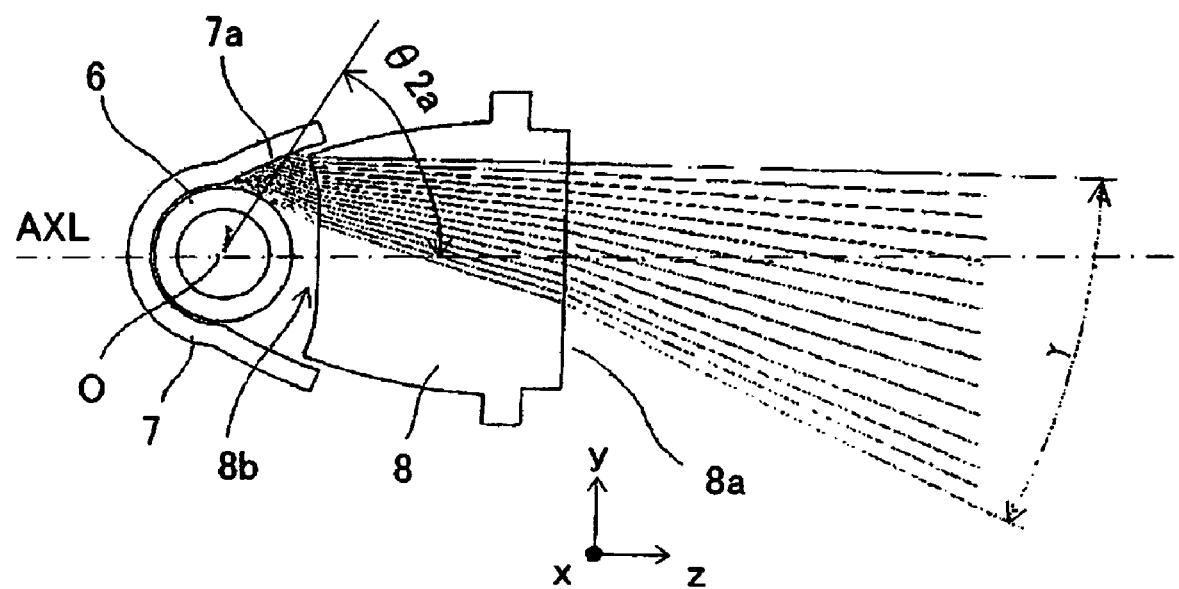
FIG. 4C is a section view of the illumination apparatus of Embodiment 1 in the YZ plane.

FIGS. 4A to 4C are section views of the illumination apparatus 5 in the plane (the YZ plane) including the diameter direction of the arc tube 6. An entrance surface 8*b* of the optical member 8 has a first entrance portion (a first area) 8*b*1 which mainly receives part of the luminous flux emitting forward from the arc tube 6 that travels close to the irradiation optical axis AXL, that is, a first luminous flux emitting at a smaller angle than a first angle $\theta 1$ with respect to the irradiation optical axis AXL, and a second entrance portion (a second area) 8*b*2 which mainly receives part of the luminous flux that travels diagonally forward, that is, a second luminous flux emitting at an angle larger than the first angle $\theta 1$ (shown as an angle $\theta 1a$ slightly larger than the angle $\theta 1$ in FIG. 4B) and smaller than a second angle $\theta 2$ with respect to the irradiation optical axis AXL. The optical member 8 also has a total reflection surface 8*c* which substantially totally reflects the second luminous flux that entered the optical member 8 from the second entrance portion 8*b*2.

The reflective member 7 has a reflective surface 7*a* which mainly reflects luminous flux traveling vertically from the arc tube 6 with respect to the irradiation optical axis AXL, that is, a third luminous flux emitting at a larger angle than the second angle $\theta 2$ (shown as an angle $\theta 2a$ slightly larger than the angle $\theta 2$ in FIG. 4B) and a semicylindrical portion 7*b* which mainly reflects luminous flux traveling backward to the center of the arc tube 6.

It should be noted that FIGS. 4A to 4C show the shapes of the optical member 8 and the reflective member 7 as well as the light ray trace diagrams of the first to third luminous fluxes emitting from the center of the arc tube 6.

In Embodiment 1, the arc tube 6, the reflective member 7, and the optical member 8 have shapes vertically symmetrical with respect to the irradiation optical axis AXL. Since the light ray trace diagram is also vertically symmetrical, a light ray trace diagram of part of the luminous flux emitting from the center of the light source that travels downward initially on the papers is omitted in FIGS. 4A to 4C.

The illumination apparatus 5 of Embodiment 1 is characterized in that it can provide a uniform light distribution characteristic in the vertical direction (the Y direction) and it can have an extremely small aperture height in the vertical direction. Description will hereinafter be made of the shapes for realizing those characteristics and how the light rays travel.

In FIGS. 4A to 4C, the arc tube 6 is shown with the inner and outer diameters of the glass tube thereof. An actual arc tube in the illumination apparatus of this type is often caused to emit light fully in the inner diameter to improve the efficiency, and thus it can be safely said that the arc tube emits light fully in the inner diameter substantially uniformly.

In the design phase, however, to control the light emitting from the arc tube (the light source) 6 efficiently, it is better to design the shape of the optical system assuming that a point source of light is ideally present at a light source center O and then make correction by taking account of the light source having a certain finite size, rather than to consider all the luminous flux in the inner diameter at a time.

Based on the idea, in Embodiment 1, the center of the inner and outer diameters of the arc tube 6 is considered as a reference position for determining the shapes, and the shapes of the respective portions of the optical member 8 and the reflective member 7 are set as described below.

As the material of the optical member 8, an optical resin material such as acrylic resin is optimally used in view of the moldability and cost. In the illumination apparatus of this type, however, the light source produces a large amount of heat simultaneously with the light. It is necessary to select the optical material and define the heat radiation space in consideration of thermal energy produced in one light emission and the shortest light-emission cycle to prevent the influence of the heat.

The entrance surface 8b of the optical member 8 positioned closest to the light source is actually most affected by the heat. Thus, the shortest distance between the light source and the entrance surface 8b needs to be specified first. In Embodiment 1, a shortest distance d is defined between the first entrance portion 8b1 which receives the first luminous flux emitting from the light source center O at the angle close to the irradiation optical axis AXL and the outer diameter of the arc tube 6.

If the distance between the entrance surface 8b and the light source is too large, the entire optical system is increased in size. Thus, the shortest distance d desirably falls within the following range:

$$D/10 \leq d \leq D/2 \tag{1}$$

where D represents the diameter of the discharge arc tube 6.

Next, the shape of the entrance surface 8b is determined. In the section view shown in FIG. 4A, the first entrance portion 8b1 of the entrance surface 8b that receives the first luminous flux emitting from the light source center is formed as a flat surface substantially perpendicular to the irradiation optical axis AXL, or a cylindrical surface or a toric surface with a cross section of a quadric surface such as an arc or an ellipse with a small curvature, or a smooth free-form surface. These curved surfaces have a concave shape facing the discharge tube 6.

With the setting of the first entrance portion 8b1 in this manner, the luminous flux emitting from the light source center can be considered equal to luminous flux passing through a parallel plate, and the first luminous flux traveling close to the irradiation optical axis AXL emerges from the optical member 8 with almost no divergence or convergence. Thus, the following relationship is established:

$$\alpha \approx \theta 1 \tag{2}$$

where θ1 represents the emergence angle of the first luminous flux incident on the first entrance portion 8b1 from the light source center O with respect to the irradiation optical axis AXL and α represents the emergence angle of the first luminous flux from the emergence surface 8a of the optical member 8. The abovementioned relationship means that the angle α is substantially equal to the angle θ1. In this case, the aperture height h of the emergence surface 8a can be set to an appropriate size to control the luminous flux such that the emergence angle α corresponds to a necessary light distribution angle.

Specifically, of the first luminous flux that emitted from the light source center O and entered the optical member 8 from the first entrance portion 8b1, the luminous flux traveling on the irradiation optical axis AXL passes through the optical member 8 as it is. With this luminous flux component regarded as the base, the first luminous flux emerges from the emergence surface 8a at the emergence angle α substantially equal to the angle θ1 of emergence from the light source center O with respect to the irradiation optical axis AXL. "Being substantially equal" includes the case where they are precisely identical and the case where they are not precisely identical and different in the range in which they can be considered identical in terms of the optical characteristics.

Next, in the section view shown in FIG. 4B, the second entrance portion 8b2 which receives the second luminous flux emitting from the light source center O is formed as a flat surface inclined with respect to the irradiation optical axis AXL, or a cylindrical surface or a toric surface with a cross section of a quadric surface such as an arc or an ellipse, or a smooth free-form surface. These curved surfaces have a concave shape facing the discharge tube 6.

In the section view shown in FIG. 4B, an angle φ represents the inclination of the second entrance portion 8b2 with respect to the irradiation optical axis AXL when it is formed as a flat surface, or, when the second entrance portion 8b2 is formed as a curved surface, represents the (smallest) inclination of the tangent to the curved surface with respect to the irradiation optical axis AXL on the acute angle side (the inclination of the tangent at the end of the curved surface most distant from the irradiation optical axis AXL). The inclination φ desirably falls within the following range:

$$45° \leq \varphi < 90° \tag{3}$$

by taking account of a reduction in refracted light due to reflection on the entrance surface 8b when the third luminous flux reflected by the reflective surface 7a of the reflective member 7, later described, is incident on the second entrance portion 8b2, and the placement of the second entrance portion 8b2 farther from the light source than the first entrance portion 8b1 to reduce the influence of the heat from the light source.

Next, the inclination of the total reflection surface 8c is set to reflect substantially totally the luminous flux incident thereon from the second entrance portion 8b2. Specifically, the shape of the total reflection surface 8c is defined such that the luminous flux totally reflected by the portion of the total reflection surface 8c closest to the subject forms the largest angle with respect to the irradiation optical axis AXL. In other words, the shape of the total reflection surface 8c is specified with a continuous aspheric surface as expressed by:

$$\beta = f(\theta 1) \tag{4}$$

where θ1 represents the angle of the luminous flux incident on the second incident portion 8b2 with respect to the irradiation optical axis AXL and β represents the angle of the second luminous flux emerging from the emergence surface 8a with respect to the irradiation optical axis AXL after the control by the total reflection surface 8c of the optical member 8.

As shown in FIG. 4B, of the second luminous flux emitting from the light source center O, entering the optical member 8 from the second entrance portion 8b2, and substantially totally reflected by the total reflection surface 8c, the light ray emitting from the light source center O at the smallest emergence angle θ1a with respect to the irradiation optical axis AXL is reflected by the total reflection surface 8c and thus changed into a component which emerges at the largest angle with respect to the irradiation optical axis AXL. Of the second luminous flux substantially totally reflected by the total reflection surface 8c, the light ray emitting from the light source center O at the largest emergence angle θ2 with respect to the irradiation optical axis AXL is reflected by the total reflection surface 8c and thus changed into a component closest to parallel with the irradiation optical axis AXL.

The portion of the total reflection surface 8c that reflects the luminous flux component present between the components at the emergence angles θ1 and θ2 is formed to have a surface shape in which the emergence angle from the emergence surface 8a is gradually changed within the abovementioned emergence angle β in proportion to the emergence angle from the light source center O.

Specifically, the total reflection surface 8c is formed to have the shape expressed by:

$$\beta = m(\theta 2 - \theta 1)(\theta 1a \leq \theta 1 \leq \theta 2) \quad (5)$$

where θ1 represents the angle of the luminous flux traveling from the light source center O toward the second entrance portion 8b2 with respect to the irradiation optical axis AXL, β represents the emergence angle from the emergence surface 8a, θ2 represents the angle of the light ray entering the optical member 8 from the end of the second entrance portion 8b2 (the portion farthest from the irradiation optical axis AXL) with respect to the irradiation optical axis AXL, and m represents a constant of proportion depending on the necessary irradiation angle.

In the section views of FIGS. 4A to 4C, the first entrance portion 8b1 of the entrance surface 8b may be connected to the second entrance surface 8b2 with the discontinuous border between them. In Embodiment 1, however, the border is formed as a curved surface with a continuously changed inclination from one to the other of the entrance portions 8b1 and 8b2.

As described above, the entrance surface 8b of the optical member 8 of Embodiment 1 has the concave shape as a whole facing the arc tube 6 without including a convex shape facing the arc tube 6.

Next, in Embodiment 1, as shown in FIG. 4C, the shape of the reflective surface 7a of the reflective member 7 is determined in the following manner in order to achieve uniform light distribution in the necessary irradiation area with the minimum shape.

Specifically, when the shape of the entrance surface 8b is already determined as described above, the reflective surface 7a is shaped to establish a certain correlation between the emergence angle of the third luminous flux from the light source center O and the emergence angle of the third luminous flux from the optical member 8 after it is reflected by the reflective surface 7a and passed through the optical member 8. In other words, the shape of the reflective surface 7a is specified with a continuous aspheric shape as expressed by:

$$\gamma = g(\theta 1) \quad (6)$$

where θ1 represents the emergence angle of the third luminous flux from the light source center O, and γ represents the emergence angle of the third luminous flux from the optical member 8 after the reflection by the reflective surface 7a and the refraction by the entrance surface 8b. Particularly, in Embodiment 1, θ1 and γ are set to have a proportional relationship among those correlations to realize a uniform light distribution characteristic.

With this setting, of the third luminous flux emitted from the light source center O and the reflected by the reflective surface 7a, the luminous flux component at the smallest emergence angle θ1, that is, the luminous flux component reflected by the end of the reflective surface 7a is incident on the entrance surface 8b and then is changed into a component closest to parallel with the irradiation optical axis AXL. On the other hand, the component at the largest emergence angle θ1, that is, the component in the direction perpendicular to the irradiation optical axis AXL is reflected by the reflective surface 7a and incident on the entrance surface 8b and thus changed into a component emerging at the largest angle with respect to the irradiation optical axis AXL.

The portion of the reflective surface 7a that reflects the luminous flux component present between the components at the largest and smallest emergence angles is formed to have a surface shape in which the emergence angle from the optical member 8 is gradually changed within the abovementioned emergence angle γ in proportion to the emergence angle from the light source center O.

Specifically, the reflective surface 7a is formed to have the shape expressed by:

$$\gamma = n(\theta 1 - \theta 3)(\theta 3 \leq \theta 1 \leq 90°) \quad (7)$$

where θ1 represents the angle of the luminous flux traveling toward the reflective surface 7a with respect to the irradiation optical axis AXL, γ represents the emergence angle from the emergence surface 8a, θ3 represents the angle of the light rays reflected by the end of the reflective surface 7a with respect to the irradiation optical axis AXL, and n represents a constant of proportion depending on the necessary irradiation angle.

Although not shown, description will be made of the optical path of luminous flux traveling to the rear of the arc tube 6 on the irradiation optical axis. The semicylindrical portion 7b concentric with the light source center O is provided in the rear on the irradiation optical axis, and the glass tube of the arc tube 6 is also concentric with the light source center O, so that all the luminous flux emitting backward from the light source center O is returned to the light source center O without being affected by refraction through the glass tube. The light rays returned to the light source center O are applied to the necessary irradiation area substantially uniformly with substantially the same characteristics as those in the light ray trace diagrams shown in FIGS. 4A to 4C.

In addition, the shapes of the respective surfaces can be set such that the first to third luminous fluxes after they are changed by the optical member 8 and the reflective member 7 have substantially the same light distributions, thereby realizing uniform light distribution in the necessary irradiation area.

Thus, the illumination apparatus for a camera desirably has the respective values falling within the following ranges except when special light distribution is required.

Specifically, the following are satisfied:

$$0.8 \leq |\beta max/\alpha max| \leq 1.2 \quad (8)$$

$$0.8 \leq |\gamma max/\alpha max| \leq 1.2 \quad (9)$$

where αmax represents the maximum angle of the first luminous flux entering the optical member 8 from the first entrance portion 8b1 of the entrance surface 8b and emerging from the emergence surface 8a with respect to the irradiation optical axis AXL, βmax represents the maximum angle of the second luminous flux entering the optical member 8 from the second entrance portion 8b2, reflected by the total reflection surface 8c, and then emerging from the emergence surface 8a with respect to the irradiation optical axis AXL, and γmax represents the maximum angle of the luminous flux reflected by the reflective surface 7a of the reflective member 7, entering the optical member 8 from the entrance surface 8b, and emerging from the emergence surface 8a with respect to the irradiation optical axis AXL. In other words, αmax, βmax, and γmax are substantially equal.

When the inner diameter of the light source is sufficiently small or when the optical member is considered sufficiently large for the light source, the abovementioned method can be used to control the light distribution with considerable efficiency.

In considering the actual light distribution, however, the inner diameter of the light source serving as an effective light-emission portion thereof is not negligibly small in many cases, and the size of the light source has a great influence upon the entire light distribution characteristic. Since the finite size of the light source causes a certain spread of light distribution, the shapes need to be set by taking account of that factor to some extent.

On the other hand, assuming that the light source is a point source of light, the shapes desirably match the ones determined as described above, but actually, the light source has a finite size corresponding to the inner diameter of the arc tube and thus substantially the same light distribution characteristic can be provided even when the shapes are not strictly specified as described above.

There are shapes which can realize the effects substantially equal to the light distribution characteristic provided by the shapes determined as described above, for example, a single or a plurality of flat surfaces or cylindrical surfaces or quadric surfaces such as ellipses approximate to the shapes determined as described above.

Consequently, the shapes of the entrance surface $8b$, the total reflection surface $8c$ of the optical member 8, and the reflective surface $7a$ of the reflective member 7 are not limited to the shapes in which the abovementioned expressions are strictly satisfied, and may be shapes which approximately correspond to the shapes of the respective surfaces of the optical member and the reflective member.

When the optical member and the reflective member are formed with the approximate shapes, it is advantageously possible to measure whether actually processed members are manufactured as designed or not extremely easily as compared with the aspheric shape used for the surfaces.

In fact, experiments performed by using the optical member and the reflective member manufactured in the approximate shapes showed a light distribution characteristic which is not greatly different from that in the shapes expressed by the abovementioned expressions (4) to (9).

In Embodiment 1, assuming that the apparatus is used for an actual product, a thin rib $8d$ is formed integrally with the optical member 8 around the entire outer periphery on the front side of the optical member 8, that is, as an extension of the total reflection surface $8c$ of the optical member 8 to expose the emergence surface $8a$ of the optical member 8 as an outward member of the camera. This is shaped to match an exterior member of the camera, not shown, to prevent the camera interior from being seen through the gap between the optical member 8 and the camera exterior member, and this is added for the following purpose. Specifically, it is provided to prevent a trigger leak from occurring between the reflective member 7 made of metal and a metal cover used as an exterior part of the camera or a conductive item disposed in the gap between the optical member 8 and the camera exterior member, which would result in failure to emit light.

Generally, in the illumination apparatus as Embodiment 1, the reflective member 7 is directly supplied with a high-voltage trigger signal for the discharge arc tube 6 to start emitting light through a NESA coat of the discharge arc tube 6 in contact with the reflective member 7. In the illumination apparatus reduced in size as Embodiment 1, however, the reflective member is positioned close to the metal exterior member or the conductive item outside the camera, so that a trigger leak phenomenon easily occurs.

The addition of the rib $8d$ around the entire outer periphery on the front side of the optical member 8 as described above can extend the edge length to prevent the trigger leak phenomenon. At the same time, it effectively prevents dust or water droplet from entering into the camera from the outside.

Embodiment 2

Figure 5:
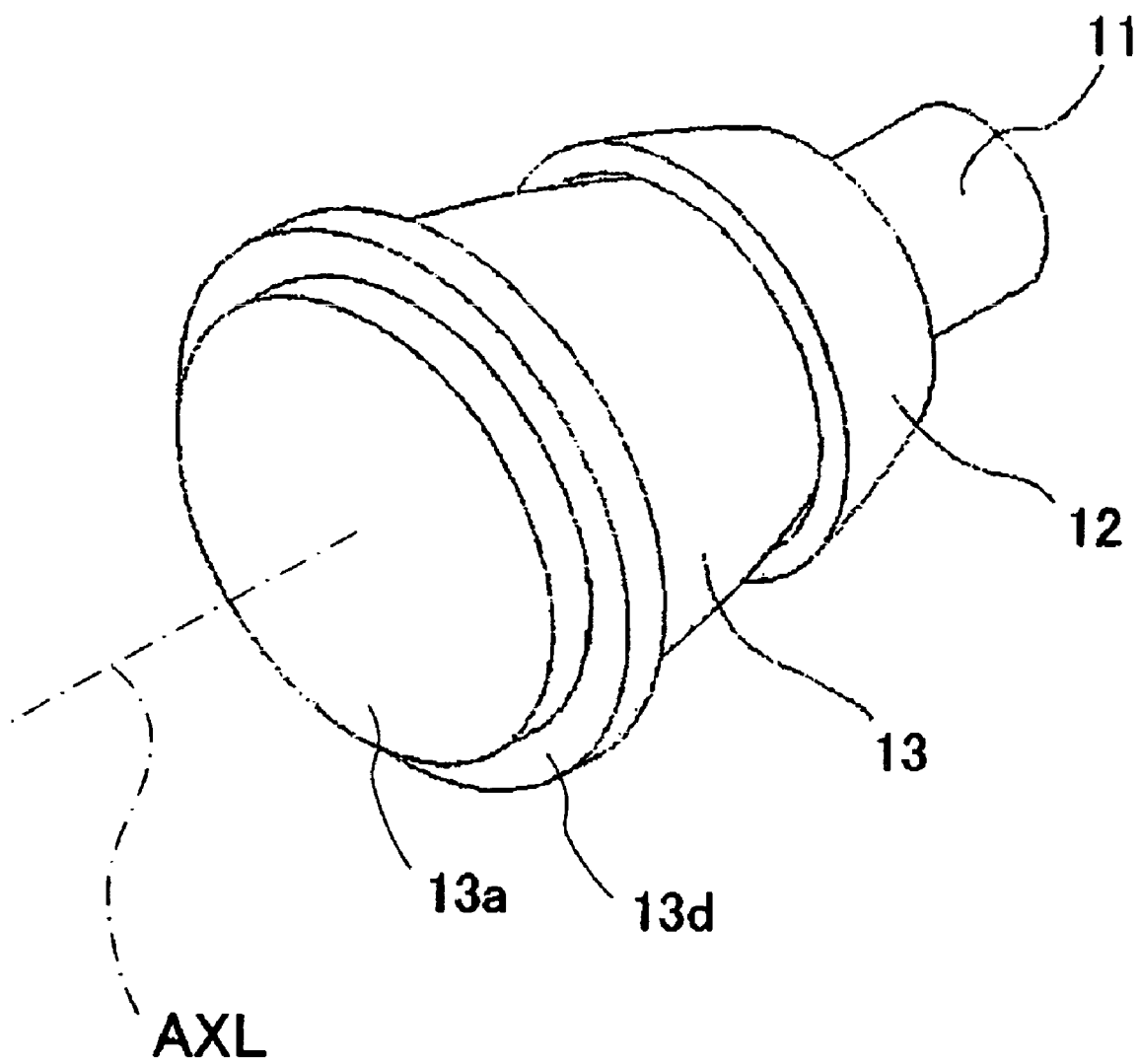
FIG. 5 is a perspective view showing an illumination apparatus which is Embodiment 2 of the present invention.
Figure 6:
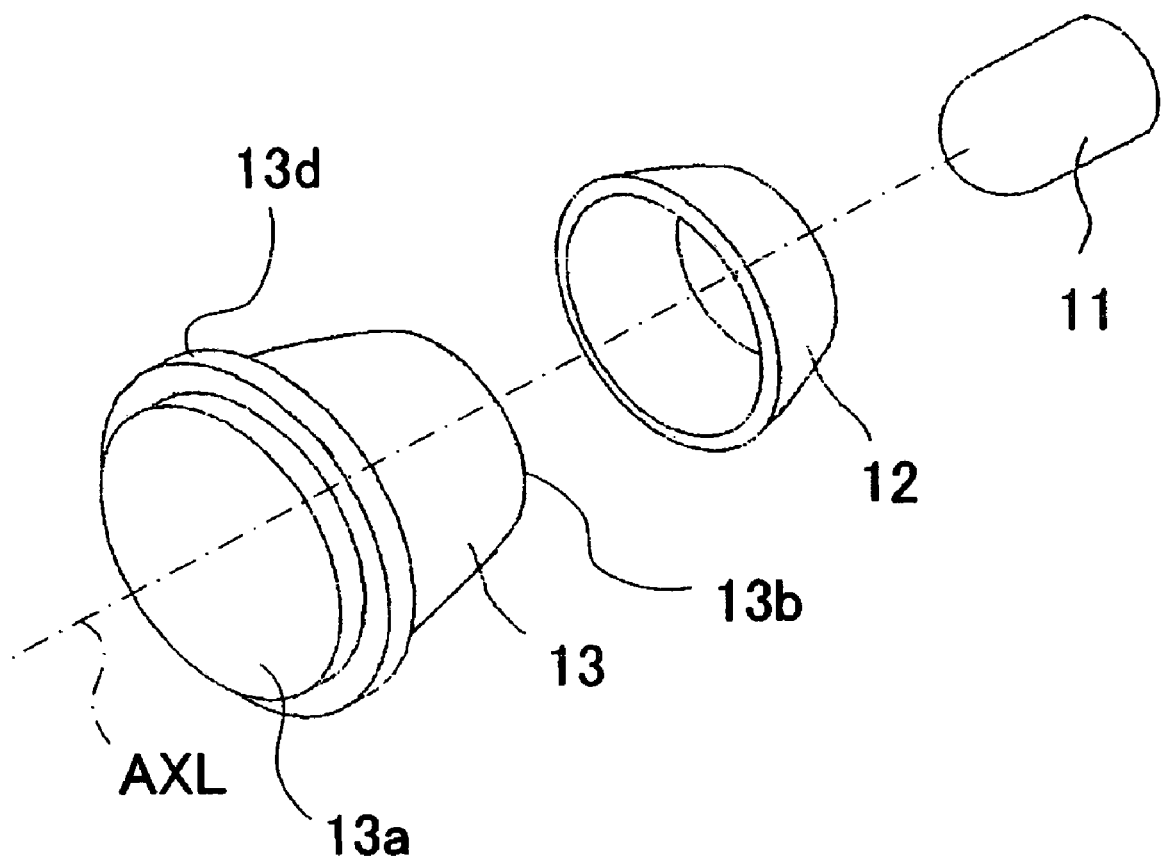
FIG. 6 is an exploded perspective view showing the illumination apparatus of Embodiment 2.

FIGS. 5 to 7 show the structure of an illumination apparatus which is Embodiment 2 of the present invention. The illumination apparatus is mounted on a camera as described in Embodiment 1. FIG. 5 is a perspective view of the illumination apparatus of Embodiment 2 when viewed from the front. FIG. 6 is an exploded perspective view of the illumination apparatus of Embodiment 2 when viewed from the front. Embodiment 2 differs from Embodiment 1 in that a reflective member and an optical member have shapes rotationally symmetrical about an irradiation optical axis through the center of a light source.

The illumination apparatus 10 has a lamp 11 which emits illumination light as a light source, a reflective member 12 which reflects part of luminous flux radiated from the lamp 11 that travels at a large angle with respect to the illumination optical axis AXL to the front toward a subject, and an optical member 13 which efficiently applies luminous flux directly entering the optical member 13 from the lamp 11 and the luminous flux entering the optical member 13 after the reflection by the reflective member 12 to a necessary irradiation range. The reflective member 12 has an inner surface made of a metal material such as bright aluminum having a high reflectivity. The optical member 13 is made of an optical material having a high transmittance such as optical glass and acrylic resin. The reflective member 12 and the optical member 13 have the shapes rotationally symmetrical about the irradiation optical axis AXL.

Figure 7A:
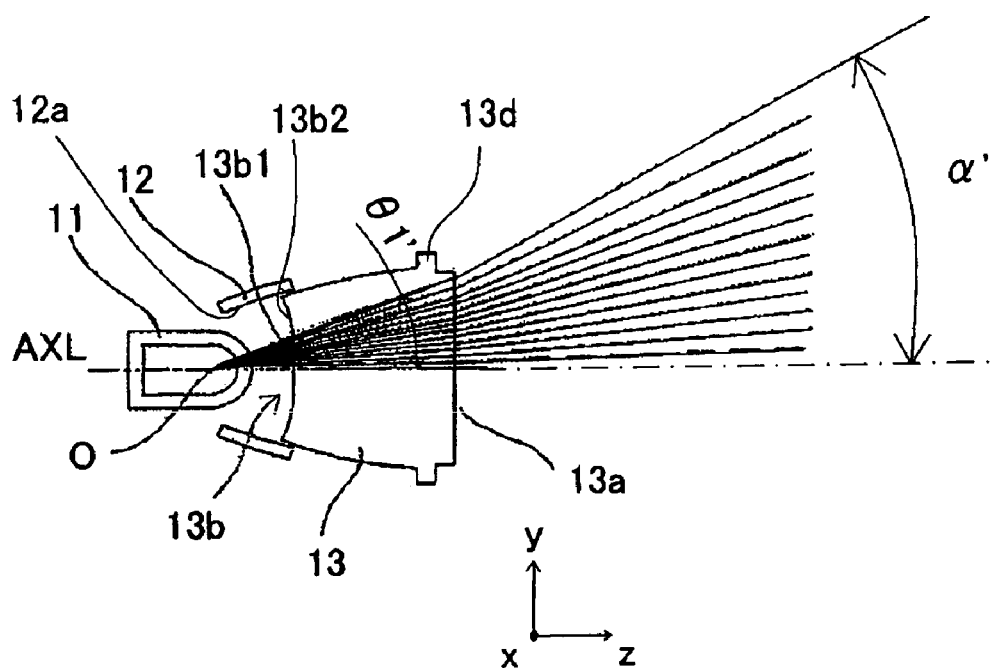
FIG. 7A is a section view of the illumination apparatus of Embodiment 2 in a YZ plane.
Figure 7B:
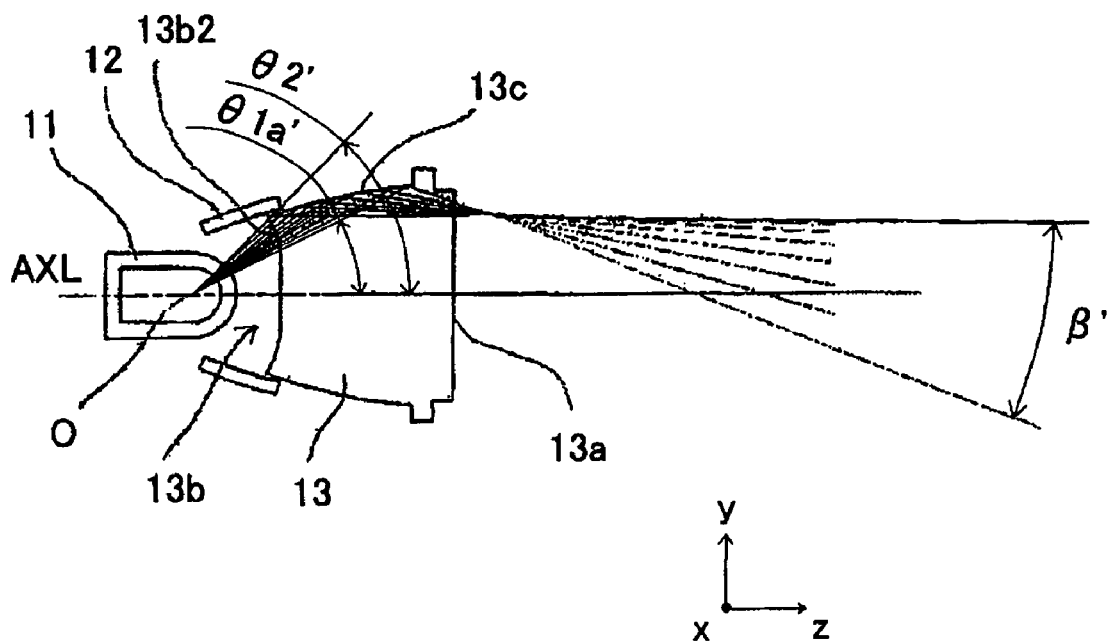
FIG. 7B is a section view of the illumination apparatus of Embodiment 2 in the YZ plane.
Figure 7C:
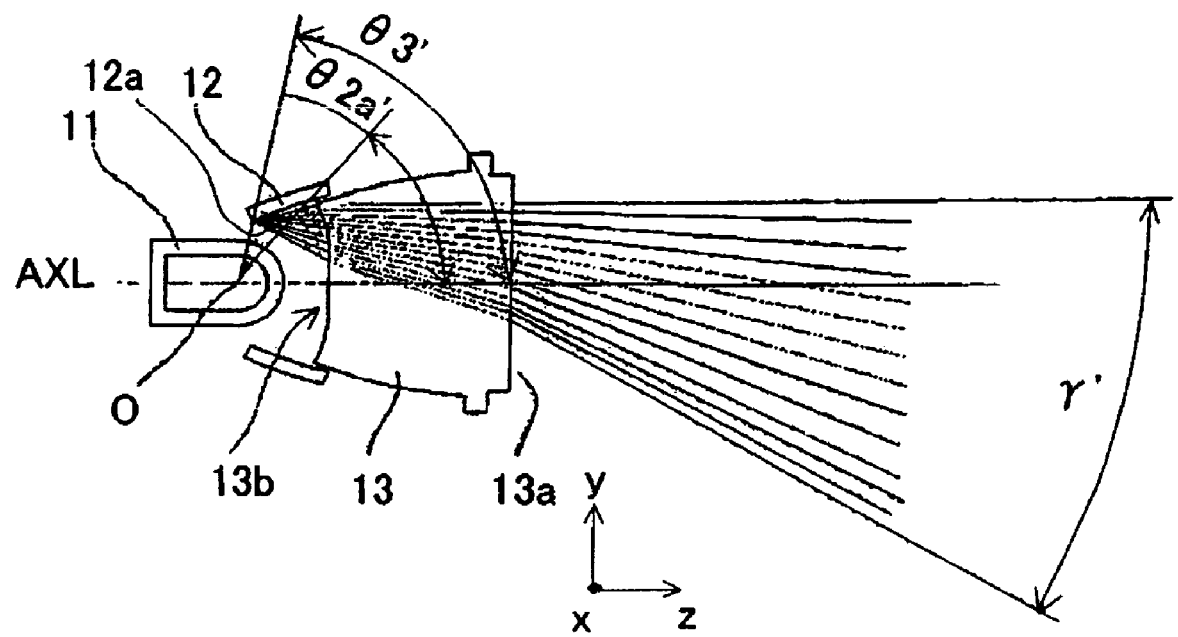
FIG. 7C is a section view of the illumination apparatus of Embodiment 2 in the YZ plane.

FIGS. 7A to 7C show section views of the illumination apparatus 10 in a plane through the irradiation optical axis AXL. The lamp 11 is shown with its filament, terminals and the like omitted. An entrance surface $13b$ of the optical member 13 has a first entrance portion (a first area) $13b1$ $\theta1'$ with respect to the irradiation optical axis AXL, and a second entrance portion (a second area) $13b2$ which mainly receives part of the luminous flux that travels diagonally forward, that is, a second luminous flux emitting at an angle larger than the first angle $\theta1'$ (shown as an angle $\theta1a'$ slightly larger than the angle $\theta1'$ in FIG. 7B) and smaller than a second angle $\theta2'$ with respect to the irradiation optical axis AXL. The optical member 13 also has a total reflection surface $13c$ which substantially totally reflects the second luminous flux incident thereon from the second entrance portion $13b2$.

The reflective member 12 has a reflective surface $12a$ which mainly reflects luminous flux traveling vertically from the lamp 11 with respect to the irradiation optical axis AXL, that is, a third luminous flux emitting at a larger angle than the second angle $\theta2'$ (shown as an angle $\theta2a'$ slightly larger than the angle $\theta2'$ in FIG. 7B).

It should be noted that FIGS. 7A to 7C show the shapes of the optical member 13 and the reflective member 12 as well as the light ray trace diagrams of the first to third luminous fluxes emitting from the center of the lamp 11.

In Embodiment 2, the lamp 11, the reflective member 12, and the optical member 13 have shapes vertically symmetrical with respect to the irradiation optical axis AXL (rotationally symmetrical about the irradiation optical axis AXL). Since the light ray trace diagram is also vertically symmetrical, a light ray trace diagram of part of the luminous flux emitting from the center of the light source that travels downward initially on the papers is omitted in FIGS. 7A to 7C.

The illumination apparatus 10 of Embodiment 2 is characterized in that it can provide a uniform light distribution characteristic and it can have an extremely small aperture diameter. Description will hereinafter be made of the shapes for realizing those characteristics and how the light rays travel. In Embodiment 2, the shapes of the optical member 13 and the reflective member 12 are set on the basis of the ideas similar to those described in Embodiment 1.

In the section view shown in FIG. 7A, the first entrance portion 13b1 of the entrance surface 13b that receives the first luminous flux from the lamp 11 is formed as a flat surface substantially perpendicular to the irradiation optical axis AXL, or a curved surface provided by rotating a quadric surface such as an arc or an ellipse with a small curvature or a smooth free-form surface about the irradiation optical axis AXL. The secured surfaces have a concave shape facing the lamp 11.

With the setting of the first entrance portion 13b1 in this manner, the luminous flux emitting from the light source center O can be considered equal to luminous flux passing through a parallel plate, and the first luminous flux emerges from an emergence surface 13a with almost no divergence or convergence.

Specifically, of the first luminous flux emitting from the light source center O and entering the optical member 13 from the first entrance portion 13b1, the luminous flux traveling on the irradiation optical axis AXL passes through the optical member 13 as it is. With this luminous flux component regarded as the base, the first luminous flux emerges from the emergence surface 13a of the optical member 13 at an emergence angle α' substantially equal to the angle θ1' of emergence from the light source center O with respect to the irradiation optical axis AXL.

In the section view shown in FIG. 7B, the second entrance portion 13b2 of the entrance surface 13b that receives the second luminous flux emitting from the lamp 11 is formed as a flat surface inclined with respect to the irradiation optical axis AXL, or a curved surface provided by rotating a quadric surface such as an arc or an ellipse about the irradiation optical axis AXL, or a smooth free-form surface. These curved surfaces have a concave shape facing the lamp 11.

In the section view shown in FIG. 7B, an angle φ represents the inclination of the second entrance portion 13b2 with respect to the irradiation optical axis AXL when it is formed as a flat surface, or, when the second entrance portion 13b2 is formed as a curved surface, represents the (smallest) inclination of the tangent to the curved surface with respect to the irradiation optical axis AXL on the acute angle side (the inclination of the tangent at the end of the curved surface most distant from the irradiation optical axis AXL). The inclination φ desirably falls within the following range:

$$45° \leq \phi < 90° \quad (3)'$$

from the same reasons as those in Embodiment 1.

The shape of the total reflection surface 13c is specified to satisfy the following. Specifically, of the second luminous flux incident thereon the second entrance portion 13b2 and substantially totally reflected by the total reflection surface 13c, the light ray emitting from the light source center O at the smallest emergence angle θ1a' with respect to the irradiation optical axis AXL is reflected by the total reflection surface 13c and thus changed into a component which emerges at the largest angle with respect to the irradiation optical axis AXL.

On the other hand, the light ray of the second luminous flux that emits from the light source center O at the largest emergence angle θ2' with respect to the irradiation optical axis AXL is reflected by the total reflection surface 13c and thus changed into a component closest to parallel with the irradiation optical axis AXL.

The portion of the total reflection surface 13c that reflects the luminous flux component present between the components at the emergence angles θa1' and θ2' is formed to have a shape in which the emergence angle from the emergence surface 13a is gradually changed within an emergence angle β', which is substantially equal to the abovementioned emergence angle α', in proportion to the emergence angle from the light source center O.

In the section views of FIGS. 7A to 7C, the first entrance portion 13b1 of the entrance surface 13b may be connected to the second entrance surface 13b2 with the discontinuous border between them. In Embodiment 2, however, the border is formed as a curved surface with a continuously changed inclination from one to the other of the entrance portions 13b1 and 13b2.

As described above, the entrance surface 13b of the optical member 13 of Embodiment 2 has the concave shape as a whole facing the lamp 11 without including a convex shape facing the lamp 11.

Next, as shown in FIG. 7C, the shape of the reflective surface 12a of the reflective member 12 is determined in the following manner in order to achieve uniform light distribution in the necessary irradiation area with the minimum shape.

When the shape of the entrance surface 13b is already determined as described above, the reflective surface 12a is shaped in Embodiment 2 to establish a certain correlation between the emergence angle of the third luminous flux from the light source center O and the emergence angle of the third luminous flux from the optical member 13 after it is reflected by the reflective surface 12a and passed through the optical member 13.

Specifically, of the third luminous flux emitted from the light source center O, the light ray emitting at the smallest emergence angle θ2a' with respect to the irradiation optical axis AXL and reflected by the end of the reflective surface 12a is incident on the entrance surface 13b and then changed into a component closest to parallel with the irradiation optical axis AXL. On the other hand, the light ray of the third luminous flux emitting at the largest emergence angle θ3' with respect to the irradiation optical axis AXL and reflected by the end of the reflective surface 12a closer to the light source is incident on the entrance surface 13b and then changed into a component emerging at the largest angle with respect to the irradiation optical axis AXL.

The portion of the reflective surface 12a that reflects the luminous flux component present between the components at the largest and smallest emergence angles θ2a' and θ3' is formed to have a shape in which the emergence angle from the emergence surface 13a is gradually changed within an emergence angle γ', which is substantially equal to the abovementioned emergence angles α' and β', in proportion to the emergence angle from the light source center O. "Being substantially equal" means that the expressions (8) and (9) described in Embodiment 1 are satisfied.

The shapes of the respective surfaces can be set such that the first to third luminous fluxes after they are changed by the optical member 13 and the reflective member 12 have substantially the same light distributions, thereby realizing uniform light distribution in the necessary irradiation area.

As described above in Embodiment 1, since the light source has a finite size, the actual light distribution has a certain spread. However, correction can be made for the influence of the size of the light source based on the abovementioned relationships to realize the shapes of the respective surfaces necessary for achieving uniform light distribution.

A rib 13d having the same function as that in Embodiment 1 is formed around the entire outer periphery on the front side of the optical member 13.

While Embodiment 2 has been described of the case where the lamp is used as the light source, another light source which has a rotationally symmetrical shape about the irradiation optical axis can be used such as an LED and a spherical arc tube.

Embodiment 3

Figure 8:
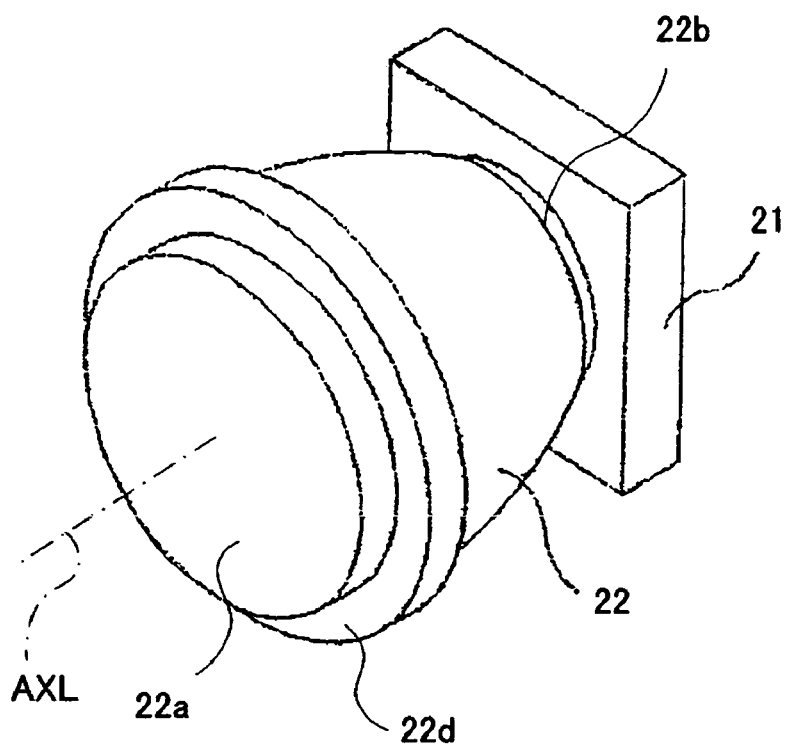
FIG. 8 is a perspective view showing an illumination apparatus which is Embodiment 3 of the present invention.
Figure 9:
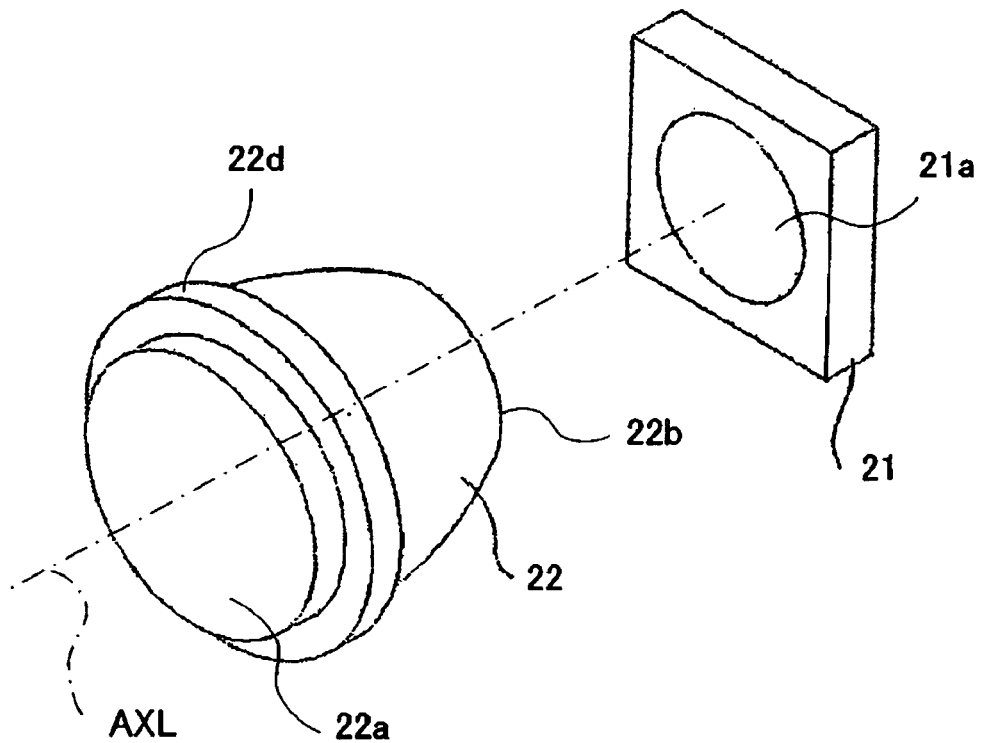
FIG. 9 is an exploded perspective view showing the illumination apparatus of Embodiment 3.

FIGS. 8 to 10 show the structure of an illumination apparatus which is Embodiment 3 of the present invention. The illumination apparatus is mounted on a camera as in Embodiment 1. FIG. 8 is a perspective view of the illumination apparatus of Embodiment 3 when viewed from the front. FIG. 9 is an exploded perspective view of the illumination apparatus of Embodiment 3 when viewed from the front. Embodiment 3 differs from Embodiment 2 in that a flat light source is used as a light source and the flat light source is positioned close to an optical member to eliminate a reflective member.

The illumination apparatus 20 has a light-emitting diode (LED) 21 which is a surface light source for emitting illumination light as a light source, and an optical member 22 which efficiently applies luminous flux entering directly from the LED 21 toward a subject. The optical member 22 is made of an optical material having a high transmittance such as optical glass and acrylic resin. The optical member 22 has a rotationally symmetrical shape about an irradiation optical axis AXL. Since the light source is realized by the LED, the optical member 22 is hardly affected adversely even when the LED is positioned close to the optical member 22. Thus, Embodiment 3 is characterized in that it can provide a uniform light distribution characteristic and can have a smaller aperture diameter than the conventional apparatus by disposing the optical member 22 close to the LED 21.

Figure 10A:
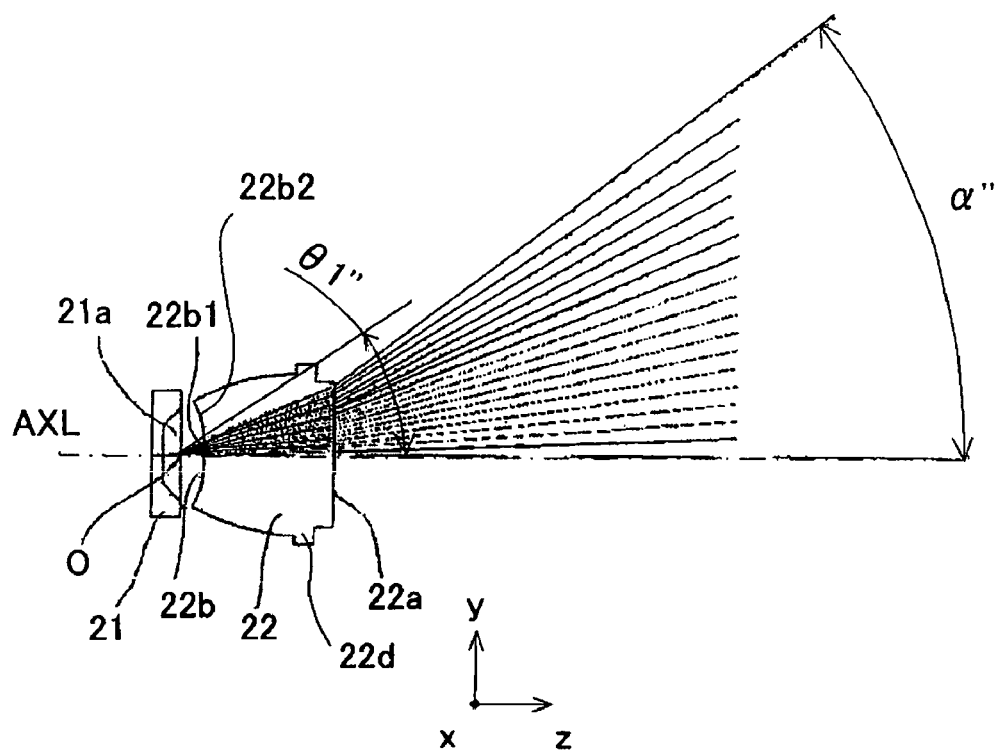
FIG. 10A is a section view of the illumination apparatus of Embodiment 3 in a YZ plane.
Figure 10B:
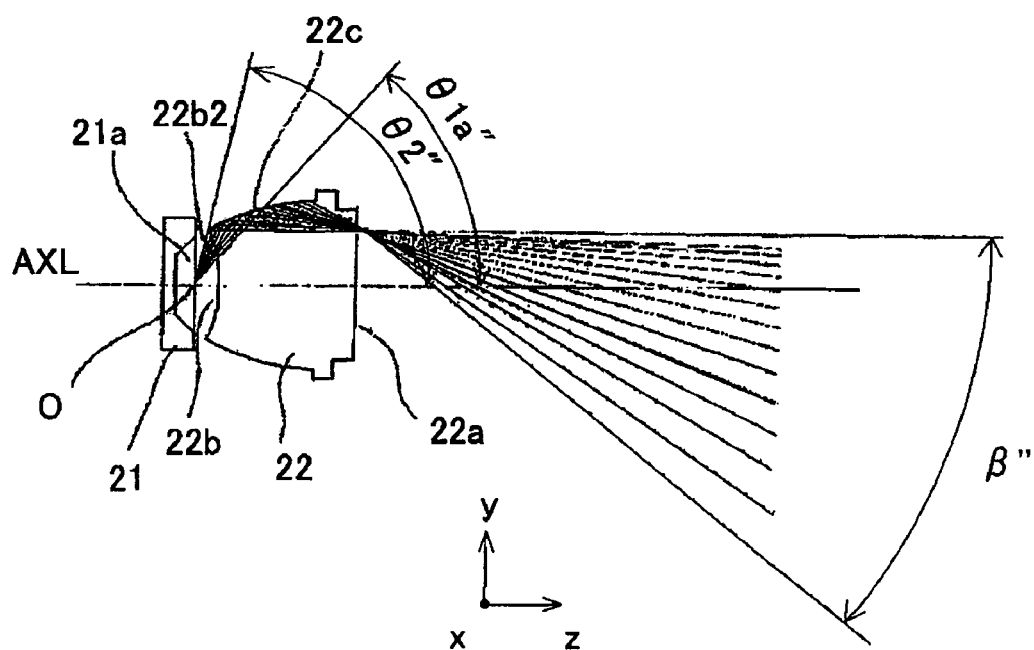
FIG. 10B is a section view of the illumination apparatus of Embodiment 3 in the YZ plane.

FIGS. 10A and 10B show section views of the illumination apparatus 20 in a plane through the irradiation optical axis AXL. A fluorescent material 21a is formed on the light-emitting surface of the LED 21.

An entrance surface 22b of the optical member 22 has a first entrance portion (a first area) 22b1 which receives part of the luminous flux emitting forward from the LED 21, that is, a first luminous flux emitting at a smaller angle than a first angle θ1" with respect to the irradiation optical axis AXL, and a second entrance portion (a second area) 22b2 which mainly receives part of the luminous flux that travels diagonally forward, that is, a second luminous flux emitting at an angle larger than the first angle θ1" (shown as an angle θ1a" slightly larger than the angle θ1" in FIG. 10B) with respect to the irradiation optical axis AXL. The optical member 22 also has a total reflection surface 22c which totally reflects the second luminous flux entering the optical member 22 from the second entrance portion 22b2 toward the subject.

It should be noted that FIGS. 10A and 10B show the shape of the optical member 22 as well as the light ray trace diagrams of the first and second luminous fluxes emitting from the center of the LED 21.

In Embodiment 3, as shown in FIGS. 10A and 10B, the LED 21 and the optical member 22 have shapes vertically symmetrical with respect to the irradiation optical axis AXL (rotationally symmetrical about the irradiation optical axis AXL). Since the light ray trace diagram is also vertically symmetrical, a light ray trace diagram of part of the luminous flux emitting from the center of the light source that travels downward initially on the papers is omitted in FIGS. 10A and 10B.

The shape of the optical member in Embodiment 3 is specified on the basis of the ideas similar to those described in Embodiment 1. Description will hereinafter be made of the shape and how the light rays travel.

In the section view shown in FIG. 10A, the first entrance portion 22b1 of the entrance surface 22b of the optical member 22 that receives the first luminous flux emitting from the light source center O is formed as a flat surface substantially perpendicular to the irradiation optical axis AXL or a rotationally symmetrical surface provided by rotating a quadric surface such as an arc or an ellipse with a small curvature about the irradiation optical axis AXL. The secured surfaces have a concave shape facing the LED 21.

With the setting of the first entrance portion 22b1 in this manner, the luminous flux emitting from the light source center O can be considered equal to luminous flux passing through a parallel plate, and the first luminous flux emerges from an emergence surface 22a with almost no divergence or convergence.

Specifically, of the first luminous flux emitting from the light source center O and entering the optical member 22 from the first entrance portion 22b1, the luminous flux traveling on the irradiation optical axis AXL through the light source center O passes through the optical member 22 as it is. With this luminous flux component regarded as the base, the first luminous flux emerges from the emergence surface 22a of the optical member 22 at an emergence angle α" substantially equal to the angle θ1" of emergence from the light source center O with respect to the irradiation optical axis AXL.

Next, in the section view shown in FIG. 10B, the end portion of the second entrance portion 22b2 that receives the second luminous flux emitting from the light source center O is formed as a flat surface inclined with respect to the irradiation optical axis AXL, or a surface provided by rotating a quadric surface such as an arc or an ellipse about the irradiation optical axis AXL, or a smooth free-form surface. These curved surfaces have a concave shape facing the LED 21.

In the section view shown in FIG. 10B, an angle φ represents the inclination of the second entrance portion 22b2 with respect to the irradiation optical axis AXL when it is formed as a flat surface, or, when the second entrance portion 22b2 is formed as a curved surface, represents the (smallest) inclination of the tangent to the curved surface with respect to the irradiation optical axis AXL on the acute angle side (the inclination of the tangent at the end of the curved surface most distant from the irradiation optical axis AXL). The inclination φ desirably falls within the following range:

$$45° \leq \varphi < 90° \qquad (3)'$$

from the same reasons as those in Embodiment 1.

The shape of the total reflection surface 22c is specified to satisfy the following. Specifically, of the second luminous flux incident thereon from the second entrance portion 22b2 and substantially totally reflected by the total reflection surface 22c, the light ray emitting from the light source center O at the smallest emergence angle θ1a" with respect to the irradiation optical axis AXL is reflected by the total reflection surface 22c and thus changed into a component which emerges at the largest angle with respect to the irradiation optical axis AXL. On the other hand, the light ray of the second luminous flux emitting from the light source center O at the largest emergence angle θ2" with respect to the irradiation optical axis AXL is reflected by the total reflection surface 22c and thus changed into a component closest to parallel with the irradiation optical axis AXL.

The portion of the total reflection surface 22c that reflects the luminous flux component present between the components at the emergence angles θa1" and θ2" is formed to have a shape in which the emergence angle from the emergence surface 22a is gradually changed within an emergence angle β", which is substantially equal to the abovementioned emergence angle α', in proportion to the emergence angle from the light source center O. "Being substantially equal" means that the expression (8) described in Embodiment 1 is satisfied.

The shapes of the respective surfaces can be set such that the first and second luminous fluxes after they are changed by the optical member 22 have substantially the same light distributions, thereby realizing uniform light distribution in the necessary irradiation area.

In the section views of FIGS. 10A and 10B, the first entrance portion 22b1 of the entrance surface 22b may be connected to the second entrance surface 22b2 with the discontinuous border between them. In Embodiment 3, however, the border is formed as a curved surface with a continuously changed inclination from one to the other of the entrance portions 22b1 and 22b2.

As described above, the entrance surface 22b of the optical member 22 in Embodiment 3 has the concave shape as a whole facing the LED 21 without including a convex portion facing the LED 21.

As described in Embodiment 1, since the light source has a finite size, the actual light distribution has a certain spread. However, correction can be made for the influence of the size of the light source based on the abovementioned relationships to realize the shapes of the respective surfaces necessary for achieving uniform light distribution.

A rib 22d having the same function as that in Embodiment 1 is formed around the entire outer periphery on the front side of the optical member 22.

While Embodiment 3 has been described of the case where the LED is used as the flat light source, another flat light source can be used such as an organic LED.

In addition, while Embodiments 2 and 3 have been described in conjunction with the optical member and the reflective member having a rotationally symmetrical shape, it is possible to use an optical member and a reflective member rotationally asymmetrical but axially symmetrical in shape when viewed from the front such as an ellipse.

As described above, according to each of Embodiments 1 to 3, the optical member can be reduced in size than the conventional apparatus while the optical member (specifically, the entrance surface) is subjected to less influence of heat from the light source. Thus, the present invention can realize a smaller size of the entire illumination apparatus and contribute to a reduction in size of the image-taking apparatus which employs the illumination apparatus.

This application claims foreign priority benefits based on Japanese Patent Applications No. 2005-068190, filed on Mar. 10, 2005, which is hereby incorporated by reference herein in its entirety as if fully set forth herein.

What is claimed is:

1. An illumination apparatus for image-taking comprising:
a light source;
a reflective member; and
an optical member which is disposed closer to a light irradiation side than the light source and has includes an emergence surface and an entrance surface integrally formed as a refractive surface, the entrance surface being integrally formed in continuous concave curved shape which includes no convex portion at least on the light source side,
wherein the entrance surface includes a first area which receives a first light component emitting from the light source at an angle smaller than a first angle with respect to an irradiation optical axis and a second area which receives a second light component emitting from the light source at an angle larger than the first angle with respect to the irradiation optical axis, the first and second areas being integrally formed as continuous concave curved surface which faces the light source, the second area being positioned closer to the light source than the first area in a direction of the irradiation optical axis,
wherein the optical member has includes a reflective surface which reflects the second light component entering the optical member from the second area, the second light component reflected by the reflective surface and then emerging from an area of the emergence surface from which the first light component emerges, the reflective surface being a total reflecting surface continuing from one end of the entrance surface toward an end of the emergence surface,
wherein the reflective member directs a third light component emitting from the light source toward the entrance surface, an angle at which the third light component emits from the light source being larger than the angle at which the second light component emits with respect to the irradiation optical axis, and
wherein the following condition is satisfied:

$45° \leq \phi < 90°$ where φ represents one of an inclination of the second area with respect to the irradiation optical axis and an inclination of a tangent to the second area on an acute angle side.

2. The illumination apparatus according to claim 1, wherein the first light component and the second light component emerge from the optical member at substantially equal angles with respect to the irradiation optical axis.

3. The illumination apparatus according to claim 1, wherein the first light component, the second light component, and the third light component emerge from the optical member at substantially equal angles with respect to the irradiation optical axis.

4. An image-taking apparatus comprising:
the illumination apparatus according to claim 1; and
an image-taking system which takes an image of an object illuminated with light from the illumination apparatus.

* * * * *